United States Patent
Zheng et al.

(10) Patent No.: US 8,948,508 B2
(45) Date of Patent: Feb. 3, 2015

(54) SYSTEM AND METHOD OF ADAPTIVE COLOR CORRECTION FOR PILL RECOGNITION IN DIGITAL IMAGES

(71) Applicant: Medsnap, LLC, Birmingham, AL (US)

(72) Inventors: Ning Zheng, Hoover, AL (US); Stephen E. Brossette, Vestavia Hills, AL (US); Patrick A. Hymel, Jr., Mountain Brook, AL (US); Daisy Y. Wong, Birmingham, AL (US)

(73) Assignee: Medsnap, LLC, Birmingham, AL (US)

( * ) Notice: Subject to any disclaimer, the term of this patent is extended or adjusted under 35 U.S.C. 154(b) by 140 days.

(21) Appl. No.: 13/665,720

(22) Filed: Oct. 31, 2012

(65) Prior Publication Data

US 2014/0119644 A1 May 1, 2014

(51) Int. Cl.
*G06K 9/00* (2006.01)

(52) U.S. Cl.
USPC .......................... 382/167; 382/162; 382/165

(58) Field of Classification Search
USPC .......... 382/162, 165, 167, 124, 143; 235/375; 257/226, 440, 444
See application file for complete search history.

(56) References Cited

U.S. PATENT DOCUMENTS

| | | | |
|---|---|---|---|
| 8,121,392 B2 * | 2/2012 | Popovich et al. | 382/143 |
| 2012/0218444 A1 | 8/2012 | Stach | |

FOREIGN PATENT DOCUMENTS

EP  1 696 383 A2  8/2006

OTHER PUBLICATIONS

Andreas Hartl, "Computer-Vision Based PHarmaceutical Phill Recognition on Mobile Phones", Proceedings of CESCG 2010: The 14th Central European Seminar on Computer Graphics, Graz University of Technology, Austria, 8 pgs.

Andreas Hartl, et al., "Instant Medical Pill Recognitionon Mobile Phones", Institute for Computer Graphics and Vision, Graz University of Technology, Austria, 8 pgs.

* cited by examiner

*Primary Examiner* — Anh Do
(74) *Attorney, Agent, or Firm* — Holland & Hart LLP

(57) ABSTRACT

A system and method for correcting colors in an image in order to identify pills. The system includes a surface that includes a background upon which pills are positioned and a border of known color adjacent to the background. The system also includes a digital camera and a processor. The processor is used to receive and process the image, use target objects on the surface to identify areas of the image that correspond to the known characteristics and features of the surface, perform image diagnostics to determine if the image can be used, and correct image color based on comparison of identified areas of the image that correspond with the known characteristics and features of the surface. Various graphical displays or cues can assist a user in obtaining a usable image.

56 Claims, 12 Drawing Sheets

SYSTEM AND METHOD OF ADAPTIVE COLOR CORRECTION FOR PILL RECOGNITION IN DIGITAL IMAGES

FIELD OF THE INVENTION

The disclosed embodiments relate to digital image processing for identification of pills, and specifically to the correction of colors in a digital image so as to facilitate identification of pills.

BACKGROUND OF THE INVENTION

Pills of many shapes, sizes and colors are available as both prescription and non-prescription medications. In the United States, the physical identifiers of solid dosage pharmaceuticals are approved by the Federal Drug Administration. Ideally, no two pills are approved to have exactly the same identifiers. Thus, pills are approved to each have a unique combination of shape, size, color, imprint (i.e., characters or numbers printed on the medication), and/or scoring. Nevertheless, despite the fact that every type of FDA-approved pill is indeed intended to be unique, the differences between pills is sometimes subtle. For example, two pills of the same shape but slightly different colors and/or sizes may easily be confused by a patient. Pills normally differentiated by imprint may not appear to be different at all, for example, if the imprints are not readable because the pills are face-down or the patient has poor vision. Such concerns are exacerbated by the actions of patients who may not be fully coherent or alert.

Patients are not the only individuals who have a need to quickly and easily identify pills. Relatives or caretakers of patients may also have such a need. Their need may stem from their responsibility to provide the correct pills to the patient, or simply from a desire to verify that the patient has taken the correct pills. Hospitals may have a need to quickly identify each of a collection of pills that a person brings from home or that may have been ingested by a child admitted for accidental ingestion of medication. Pharmacies have an interest in ensuring that correct pills are dispensed. Insurance companies may even have an interest in monitoring medication adherence, ensuring that correct pills are dispensed to and taken regularly by the insured. In other words, many parties have an interest in verifying the identity of pills, whether the pills are identified individually or as a collection of various pills.

Pills can be identified using various photographic and image processing methods. For example, a digital image of a pill or collection of pills can be taken, and then image processing methods can be used to determine how many pills are in the image, the location and boundaries of the pills in the image, and to assign pixels in the image to a potential pill for identification. This process of segmentation ideally results in every pixel in the image either being assigned to a pill with well-defined and accurate boundaries or being disregarded as not belonging to any pill. Once pixels are assigned, the accumulated pixels for a given pill can be analyzed to determine the characteristics of the pill (e.g., its size, shape, color and imprint).

Color is an important feature used in object identification, especially in pill identification, where sometimes the color of the pills is one of very few differences between two different pills that have the same size and shape. However, the color of an object can appear different under different lighting conditions. Thus, if the imaged color is not corrected, misidentification of the pill can occur.

Recognizing this challenge, traditional pill identification techniques have sometimes required that ideal lighting conditions be used during the digital imaging process. Ideal lighting conditions can ensure that the imaged color is the actual color of the pills. Unfortunately, finding ideal lighting conditions that yield true color images are generally not convenient for most individuals. Additionally, traditional color correction methods based on color distributions in a scene (such as histogram equalization) generally do not result in good color correction for pill identification.

Therefore, there is a need for a color correction method that can compensate for less than ideal lighting conditions and automatically correct imaged colors in pills prior to pill identification.

DETAILED DESCRIPTION OF THE INVENTION

In the following detailed description, reference is made to the accompanying drawings, which form a part hereof, and in which is shown by way of illustration specific embodiments that may be practiced. It should be understood that like reference numbers represent like elements throughout the drawings. Embodiments are described with sufficient detail to enable those skilled in the art to practice them. It is to be understood that other embodiments may be employed, and that various structural, logical, and electrical changes may be made without departing from the spirit or scope of the invention.

A pill is a tablet, capsule, caplet or other solid unit of medication, prescription or over-the-counter, that is taken orally. Pills vary in appearance by color, size, and shape, among other features. Pill identification through digital imaging and signal processing takes advantage of these differences in pill appearances to identify a pill. For example, an individual can use a mobile device such as a smartphone to image one or more pills. Software, resident either on the smartphone and/or remote from the smartphone, processes the image to segment the pills, identify features of each imaged pill and then compare the identified features of each pill with a database of pill features in order to determine the identity of each pill. The pill database includes an indication of color for each pill in the database. The color of each pill is standardized and is represented using one or more of several color standards (for example, RGB, HSV, YUV, etc.). Thus, when one or more pills are imaged, one or more color values for each pill are determined and then the determined color values are compared with the color values stored in the database. A match in color is one step in identifying each pill.

Figure 1:
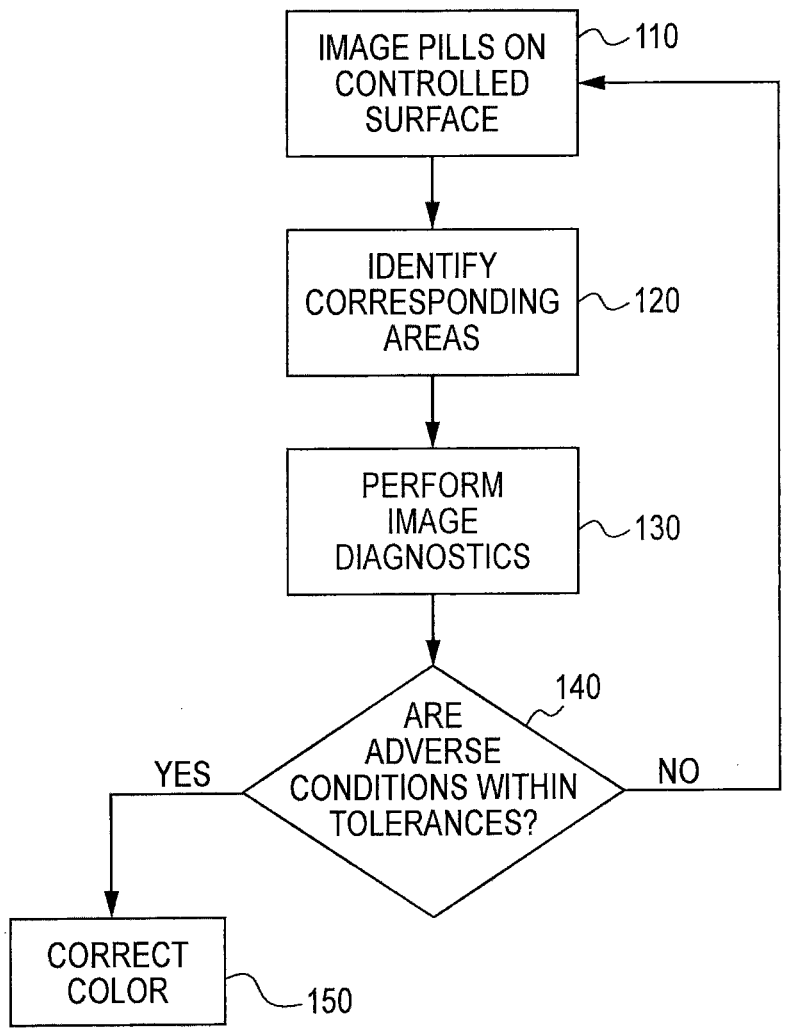
FIG. 1 illustrates a method of obtaining a color-correctable image for pill identification, in accordance with the present disclosure.

Because varying lighting conditions can affect the values of any determined colors of imaged pills, and because mobile devices are not always used in ideal lighting conditions, a method and system for automatically correcting imaged colors is presented. The method is summarized in FIG. 1. In method 100, one or more pills are imaged on a controlled surface with known characteristics and features (step 110). Once imaged, areas of the image are identified that correspond to the known characteristics and features of the controlled surface (step 120). Image diagnostics are performed on the image in order to identify any adverse imaging conditions (step 130). If identified imaging conditions are within tolerances (step 140), the color of the image is corrected based on comparison of identified areas of the image that correspond with the known characteristics and features of the controlled surface (step 150). If identified imaging conditions are not within tolerances (step 140) and are therefore adverse, the user of the mobile device is notified that a new image must be acquired. Various graphical displays or cues can assist a user in obtaining an image within tolerances.

The basic premise of method 100 is to use parts or areas of an obtained image that correspond to parts of the controlled surface, where color is known, to predict the colors of other parts of the image where the colors are not known. In doing so, a first challenge is to accurately detect areas of an obtained image that correspond to known areas of the controlled surface. Because the obtained image is generally not obtained under ideal lighting conditions, the areas of the image that correspond to known areas of the controlled surface may still have a different color (due to lighting conditions) and even a different shape (due to the mobile device being at a nonstandard angle or position). And yet, despite the differences in color and shape, the corresponding areas of the image must still be identified in order to determine any differences and in order to apply the differences to the rest of the image.

Another challenge is to diagnose conditions that are adverse to the proper correction of color as well as to other pill detection requirements. In order to ensure short processing times, the color correction model used in step 150 of method 100 typically includes assumptions and simplifications. This means, however, that certain adverse conditions may exceed the assumptions of the applied correction model and thus render the resulting correction less accurate. For example, the color correction model may assume that the colors of external lighting change smoothly across the imaged scene, thus removing the need for a more complex predictive model. Thus, an imaged scene that includes an abrupt change in external lighting (a boundary between shadow and light, for example) would constitute an adverse condition that is not able to be handled by the selected correction model. Therefore, such adverse conditions must be identified and avoided. Other examples of adverse conditions include extreme lighting conditions, extreme camera angles, poor in-camera exposure, and poor camera focus. Real-time image diagnostics and visual cues are provided to determine whether an image is even usable.

An additional challenge is to build a correction model that efficiently and effectively corrects colors across an image, even if the image is obtained under complex (though not extreme) lighting conditions.

To solve these challenges, method 100 includes the use of a controlled surface to aid in the identification of image areas that are used as a basis for the applied color correction. Various image diagnostics are tested to verify that any conditions are within tolerances. Real-time visual cues are used to notify mobile device users of detected diagnostic problems. If the diagnostics testing completes without any finding of excessive adverse conditions, then an adaptive color correction model is used that samples pixel values for color information from specified image areas where corresponding values on the controlled surface are known, calculates expected and actual color differences for each pixel or set of pixels in the specified areas, and then constructs a statistical model of the differences. The model is used to predict color differences and to correct colors for one or more unknown areas in the image.

Figure 2:
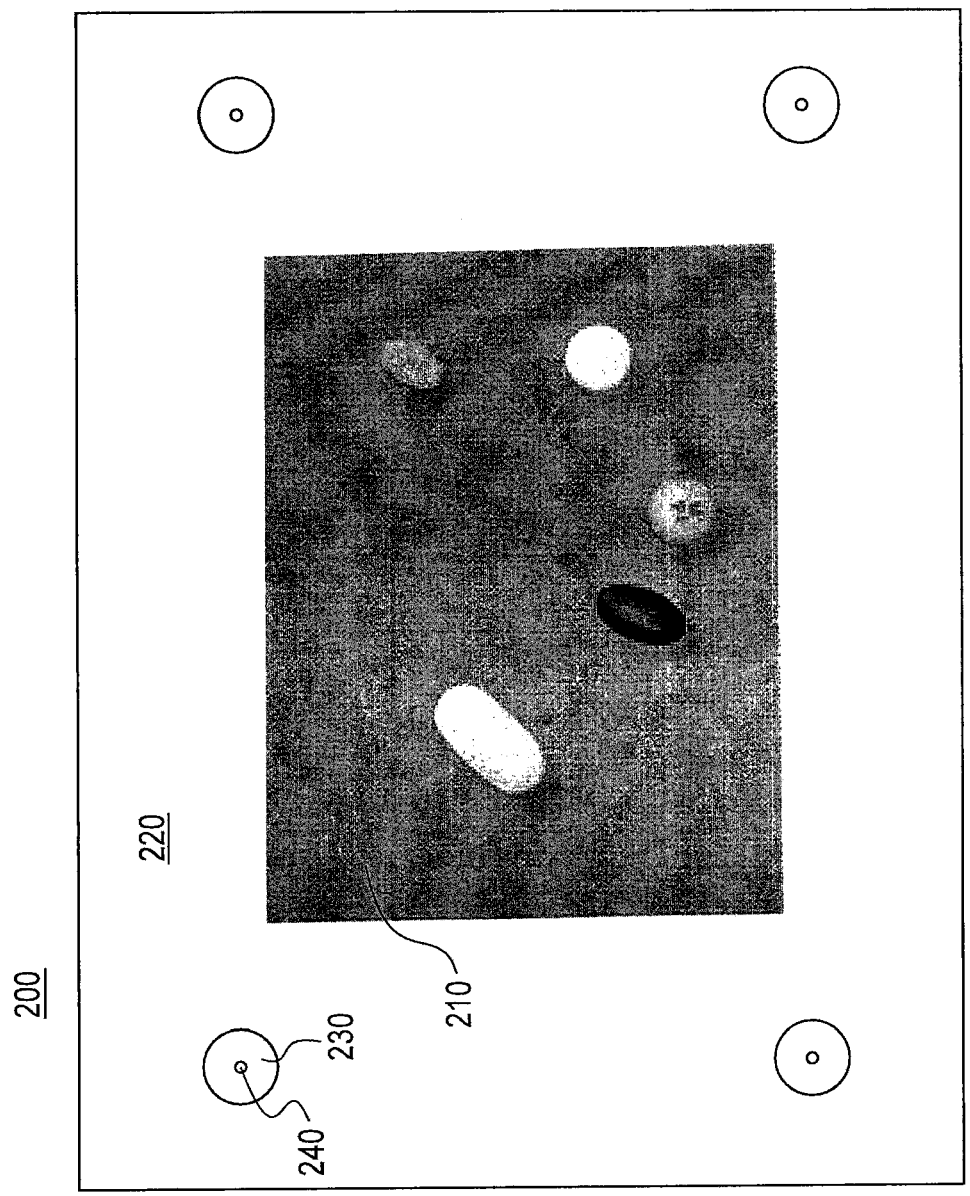
FIG. 2 illustrates a controlled surface for pill identification, in accordance with the present disclosure.

The controlled surface 200 is illustrated in FIG. 2. The controlled surface 200 includes a background 210 against which the pills are imaged. The background 210 is preferably a multi-color checkerboard background that includes a tightly-packed, closely-spaced matrix of squares. The high-density colored checkerboard pattern is used to create contrast between an imaged pill and its background, which is essential for proper pill segmentation. The background 210 is surrounded by a border 220 of known color characteristics. Typically, the border 220 is a known white. The border 220 may be other colors, but is preferably achromatic. Because the color of border 220 is known, the corresponding border areas of an image that includes the border 220 may be compared with the color characteristics of border 220 to determine any differences in color.

The controlled surface 200 also includes target objects 230, generally located in the border 220. The target objects 230 have specified color and shape features in order to make them easily detectable. For example, in FIG. 2, the target objects 230 are four bulls-eyed yellow circles located near the corners of the background 210. The target objects 230 include multiple high-contrast features. For example, in FIG. 2, the center of the bulls-eyed yellow circles is a black-filled circle with a white dot in the middle. Other high-contrast patterns could be used in the target objects 230. The high contrast features included in the target objects 230 are used for focus checking, as explained in greater detail below. Additionally, the high-contrast target objects 230 provide easy-to-detect anchor points 240. The distances between these anchor points 240 on the surface are precisely known and can be used in contrast with distances in a corresponding image to calculate the scale for the image.

Figure 3:
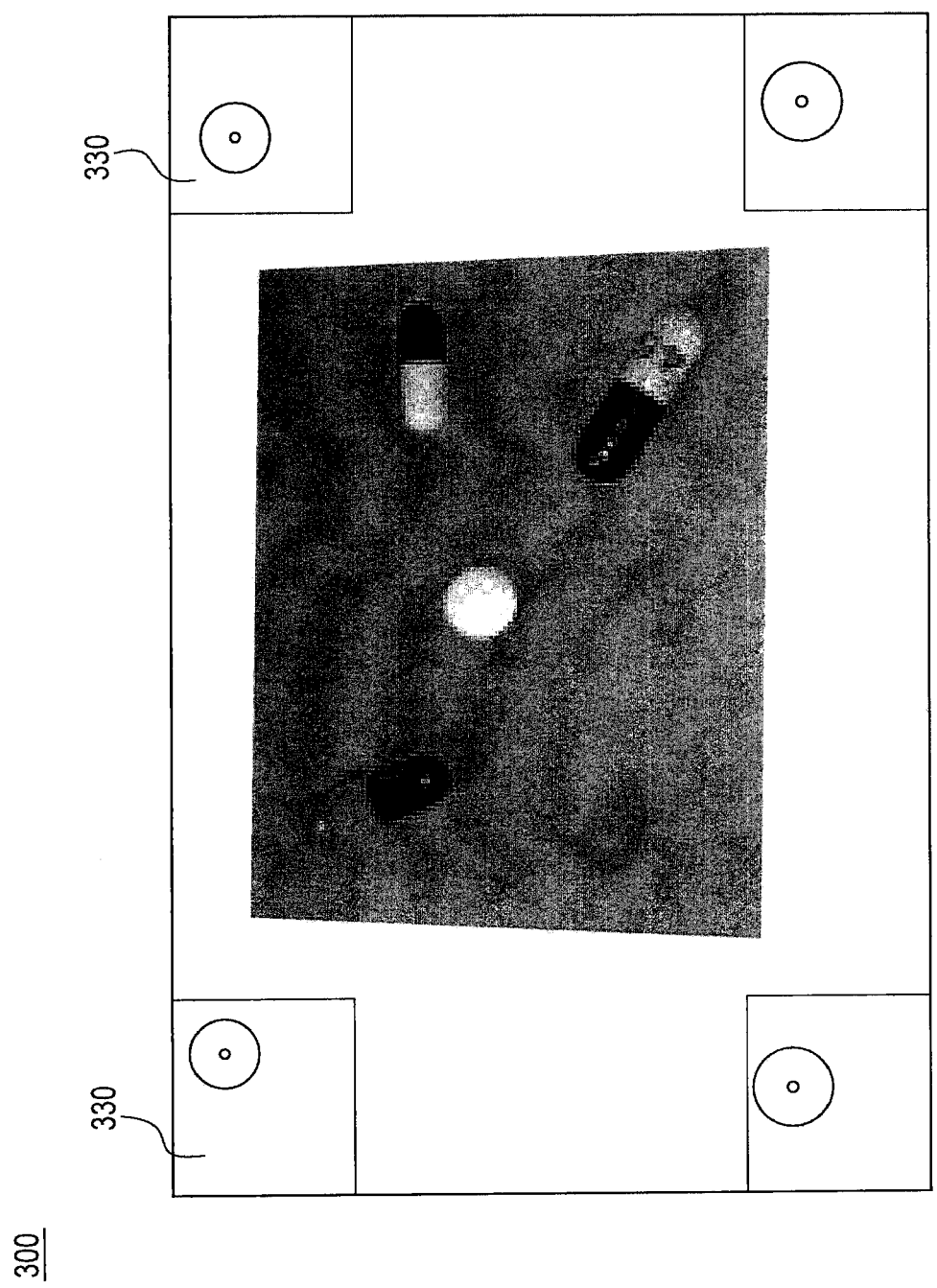
FIG. 3 illustrates an image on a mobile device, in accordance with the present disclosure.

Using controlled surface 200, corresponding surface features in an image that includes the controlled surface 200 can be detected and then used for object detection and recognition. To do this, a user of a mobile device such as a smartphone visualizes the controlled surface 200 through a viewfinder or screen of a camera. In order to generate an image of appropriate scale, the anchor points 240, e.g., the white dot in the center of each target object 230, are required to be within certain regions. This is accomplished by using software to identify the anchor points 240 in the center of the target objects 230. This is done by first searching for the target objects 230 within certain target regions. For example, when imaging the controlled surface 200, as illustrated in the smartphone- or camera-acquired image 300 of FIG. 3, the camera screen would display four target regions 330, one near each corner of the screen, in the locations of the image where the target objects 230 are most expected to be found. On-screen visual cues may be given to users in real time to help the users align the camera or smartphone so that each target object 230 is inside the corresponding target region 330. Because the target objects 230 are distinctive from the surrounding border 220 and background 210, and because of the high-contrast features included with each target object 230, standard computer vision techniques may be used by a camera to find the target objects 230 and determine whether the target objects 230 are within target regions 330.

Once the target objects 230 are located within the target regions 330, the anchor points 240 may be identified by locating the white dot at the center of each target object's black bulls-eye. Because the surface positions of the anchor points 240 on the controlled surface 200 are precisely known, the known surface positions can be compared with the identified anchor positions in the image 300, and then corrections can be made to account for any geometric skew or distortions.

Figure 4:
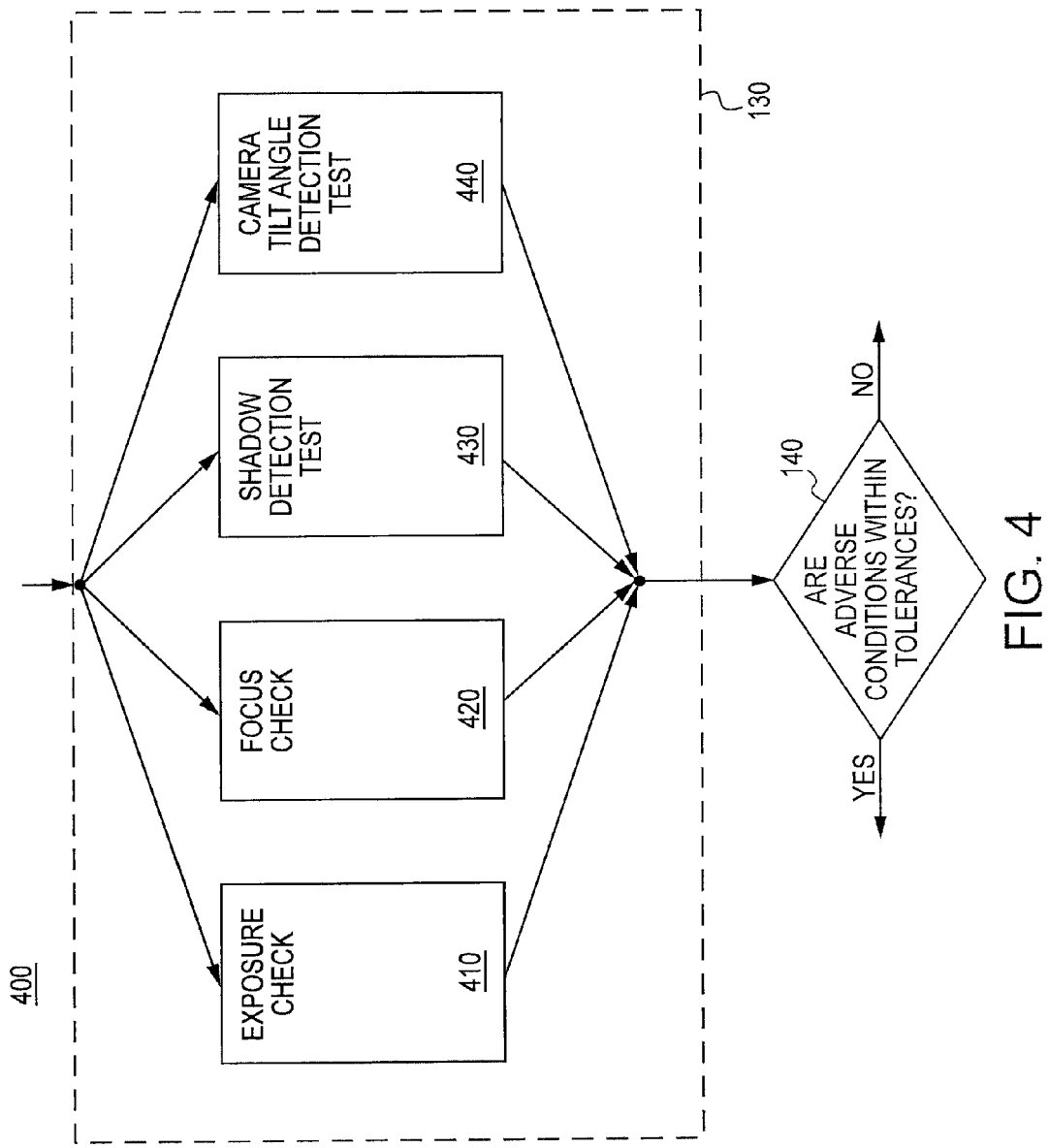
FIG. 4 illustrates method of performing image diagnostic tests, in accordance with the present disclosure.

Once the anchor points 240 have been identified and located in the scene to be imaged, various image diagnostics can be run in order to test for adverse conditions and ensure that any resulting image is acceptable for pill segmentation and identification. Thus, a number of different diagnostic tests may be run. Some tests are illustrated in method 400 of FIG. 4. Method 400 represents a more detailed illustration of steps 130 and 140 of method 100 of FIG. 1.

One diagnostic test in method 400 is an exposure check 410. Each target object 230 is checked to see if its predominate and known color (yellow in the example of FIG. 2) is within a predetermined range of color values (depending on the color standard being used). The exposure test ensures that color information is not lost due to extreme lighting conditions. In other words, it tests whether color can be restored or corrected under the given lighting conditions. If the identified dominant color in the target objects 230 is within the predetermined color range, then the image's exposure is considered to be such that colors can be corrected.

Another diagnostic test in method 400 is a focus check 420. Each target object 230 is checked to determine if the percentage of high-contrast pixels within the target object exceeds a predetermined threshold. A high-contrast pixel is a pixel that is at a boundary that exhibits a change in contrast. If an image is not in focus, the pixels will not represent a well-defined boundary and thus there will be a lower percentage of high-contrast pixels in each target object 230. However, if an image is in focus, a higher number of pixels in the target object 230 will be high-contrast pixels. If a lower threshold is exceeded for each target object, the image is considered to be focused.

Figure 5:
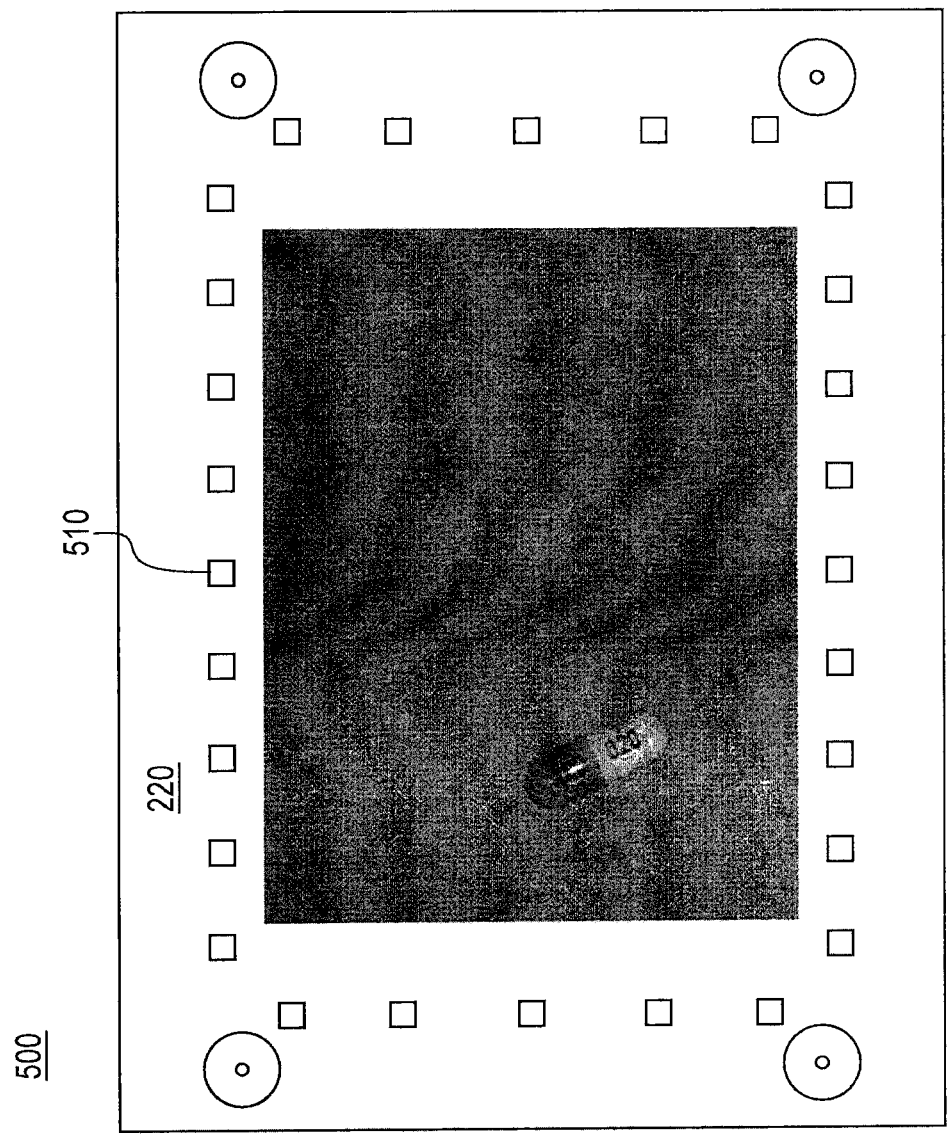
FIG. 5 illustrates an image being analyzed for shadows, in accordance with the present disclosure.

An additional diagnostic test is a shadow detection test 430. One or more strong shadows cast on the controlled surface 200 can make any resulting image difficult to color correct. To determine whether strong shadows are present on the controlled surface 200, the achromatic border 220 is sampled at periodic intervals around the border. FIG. 5, for example, indicates possible sampling points 510 in image 500. The test then determines any differences in light intensity for each of the sampled points 510 in the border 220. Differences in light intensity are determined between points in circular order, meaning in a sequential order around the border. If any differences in light intensity are significantly bigger than others, then the test assumes that a strong shadow is present and the image is not used. Thus, a predetermined difference threshold is set, and if the difference between neighboring sampled points differs from any other differences between neighboring points by more than the predetermined difference threshold, then the image is not used.

Figure 6:
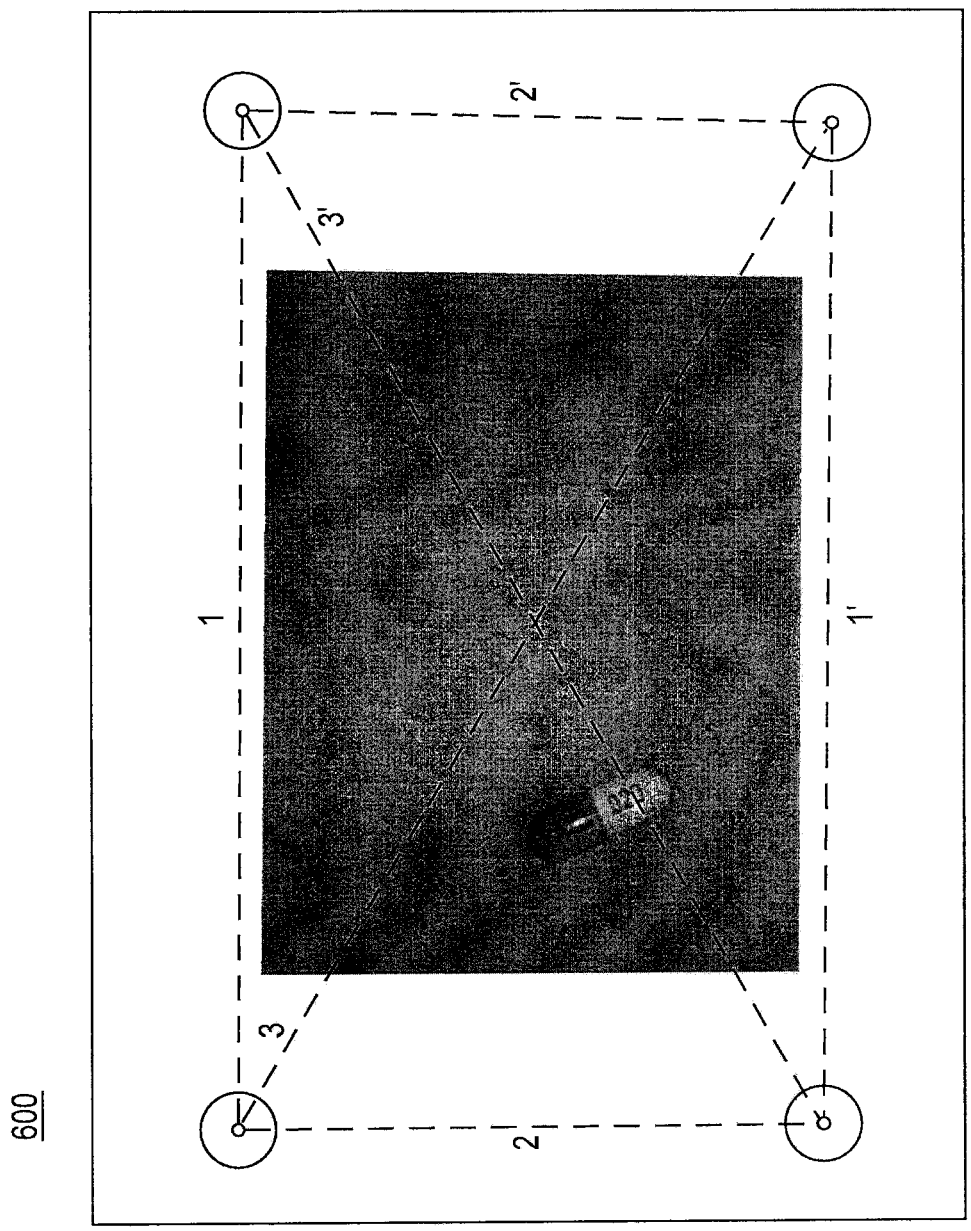
FIG. 6 illustrates an image being analyzed for tilt, in accordance with the present disclosure.

A fourth type of diagnostic test is a camera tilt angle detection test 440. Camera tilt during image capture is determined by calculating ratios of distances between pairs of anchor points 240 in the geometry-corrected image and comparing these ratios to predetermined thresholds. For example, in the image 600 of controlled surface 200 of FIG. 6, each anchor point 240 is a known distance from three other anchor points. For example, distances 1, 2, and 3 are indicated as distances between an anchor point and each of the other anchor points. An oppositely positioned anchor point is a distance 1', 2' and 3' from each of the other anchor points. In an un-tilted image, the ratio of distances 1:1', 2:2' and 3:3' would each be 1. When tilt exists, however, these ratios change. If any of the ratios are significantly different (by a predetermined amount) from the un-tilted image ratios (of 1), then significant camera tilt is detected and the image is not used. While other methods may be used to determine tilt, such as using a gyroscope, the above-described tilt angle detection test is advantageous because it does not require the mobile device to have a gyroscope or other tilt-detection technology. Additionally, the above-described method works even when the controlled surface 200 is not itself level.

Figure 7A:
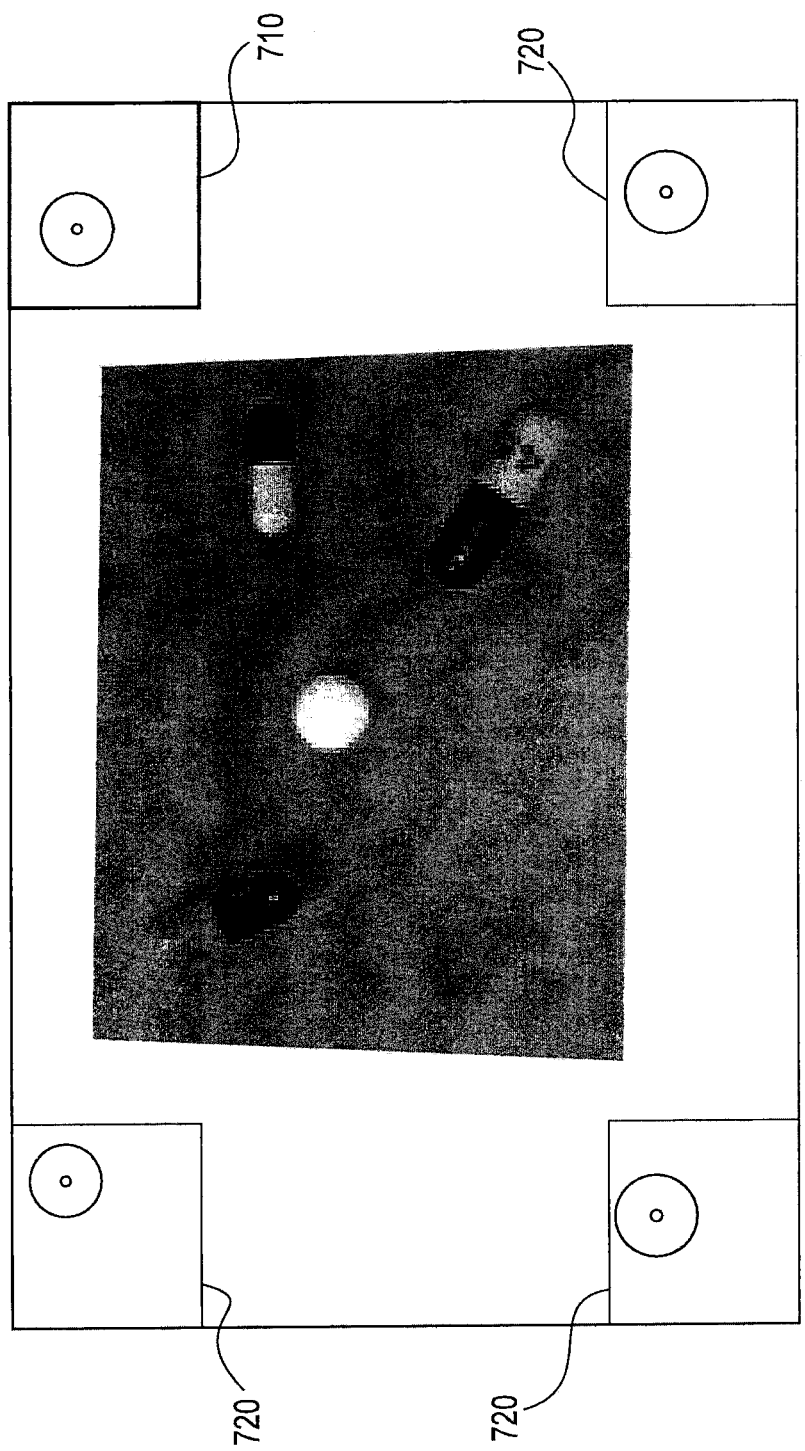
FIGS. 7A-7E illustrate visual cues used to obtain color-correctable images, in accordance with the present disclosure.

In order to assist a user of a mobile device attempting to acquire an image for pill identification, various real-time visual cues may be displayed to the user. The cues allow the user to acquire images that will pass each of the diagnostic tests applied to the images. For example, visual cues may be displayed on the mobile device's screen that indicate when one or more target objects are out of focus. In FIG. 7A, for example, target objects that are out of focus (as determined by the focus check 410) are outlined with a highlighted box (e.g., a red box) 710, while target objects that are in focus are outlined with a non-highlighted box (e.g., green boxes) 720. As a user shifts the mobile device, the target objects can be moved into focus.

Figure 7B:
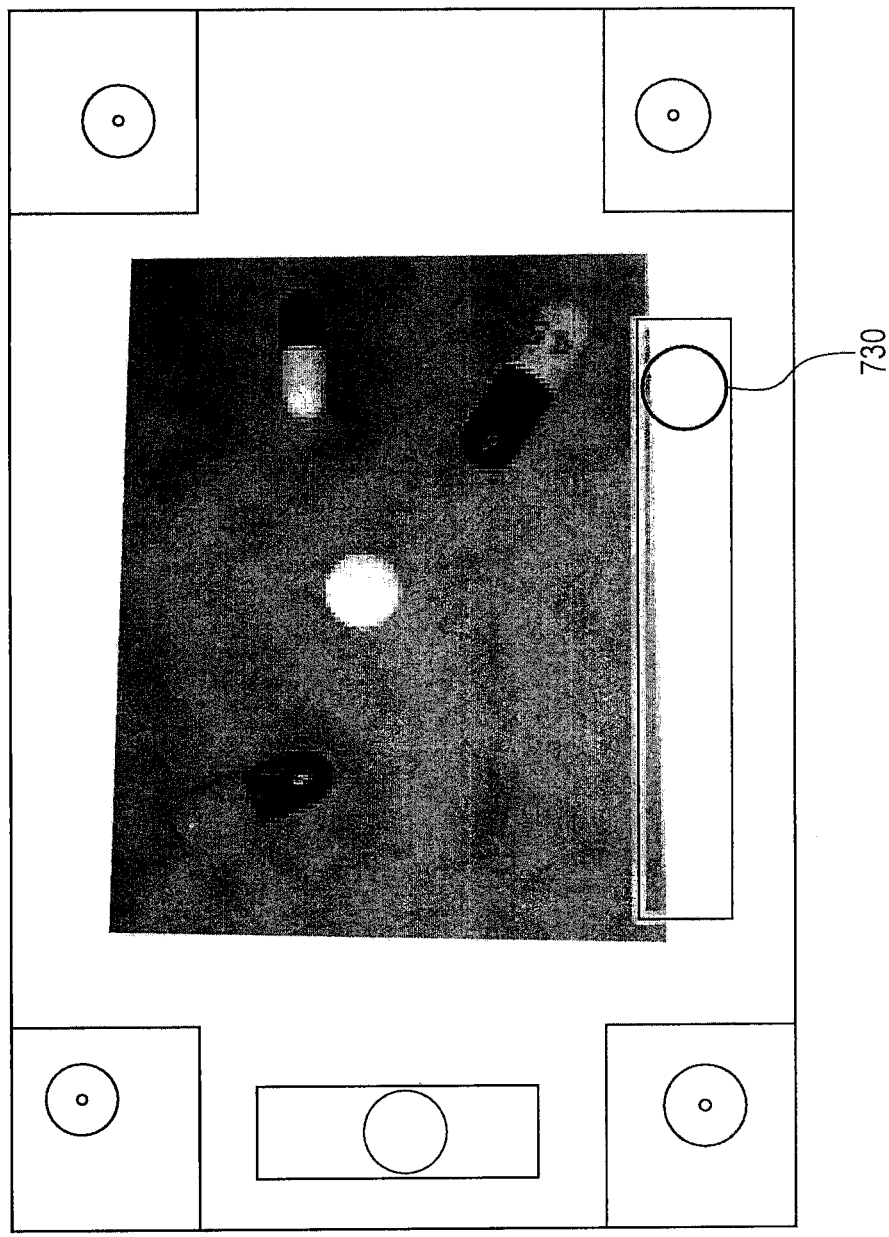
Figure 7C:
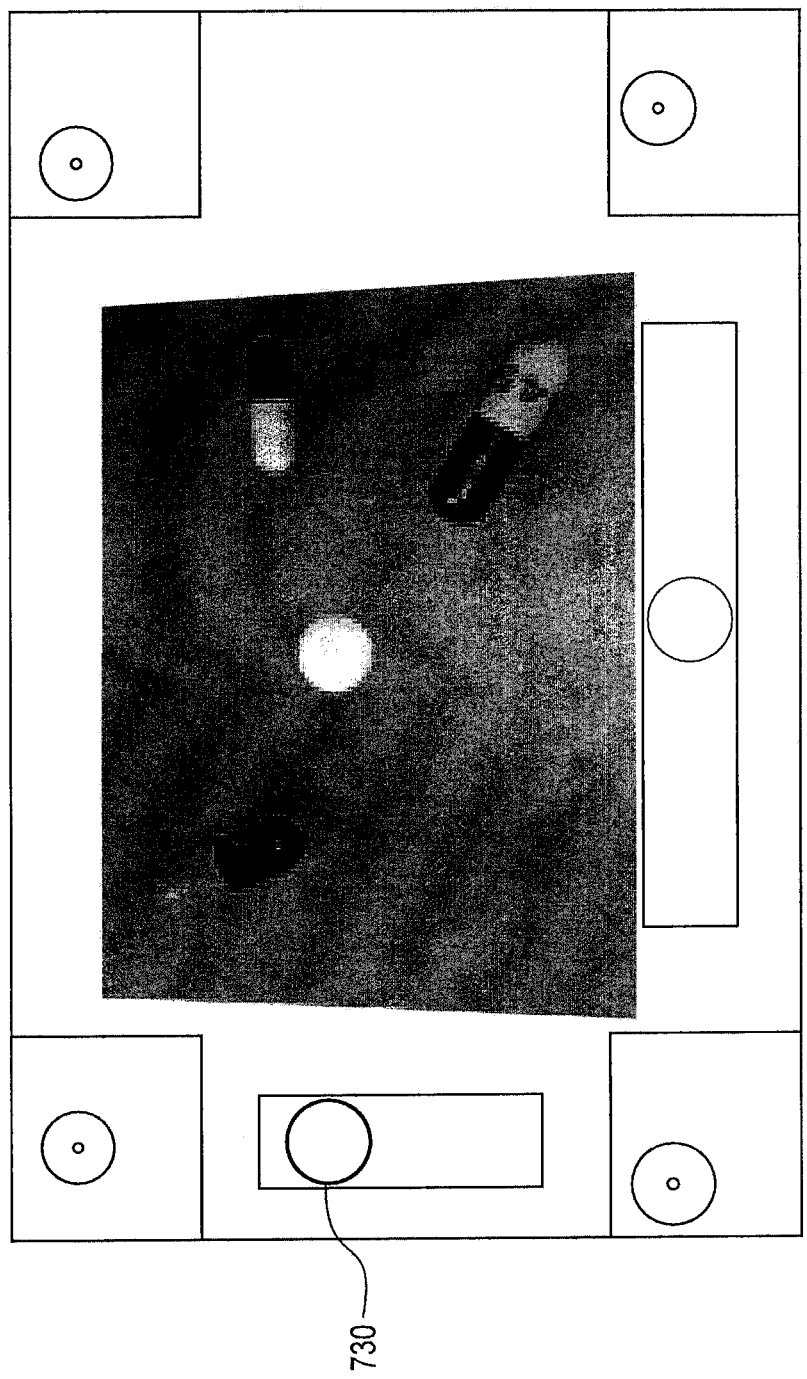

FIGS. 7B and 7C illustrate visual cues that indicate when the image is tilted too much. Red bubbles 730 in the images of FIGS. 7B and 7C indicate unacceptable camera tilt. In FIG. 7B, the unacceptable camera tilt is in the up/down direction as the image is oriented. Red bubble 730 in FIG. 7B is like a bubble in a level and indicates that the camera is not level with regards to the controlled surface 200 in at least the up/down direction. In FIG. 7C, the unacceptable camera tilt is in the left/right direction, according to the illustrated orientation of the image.

Figure 7D:
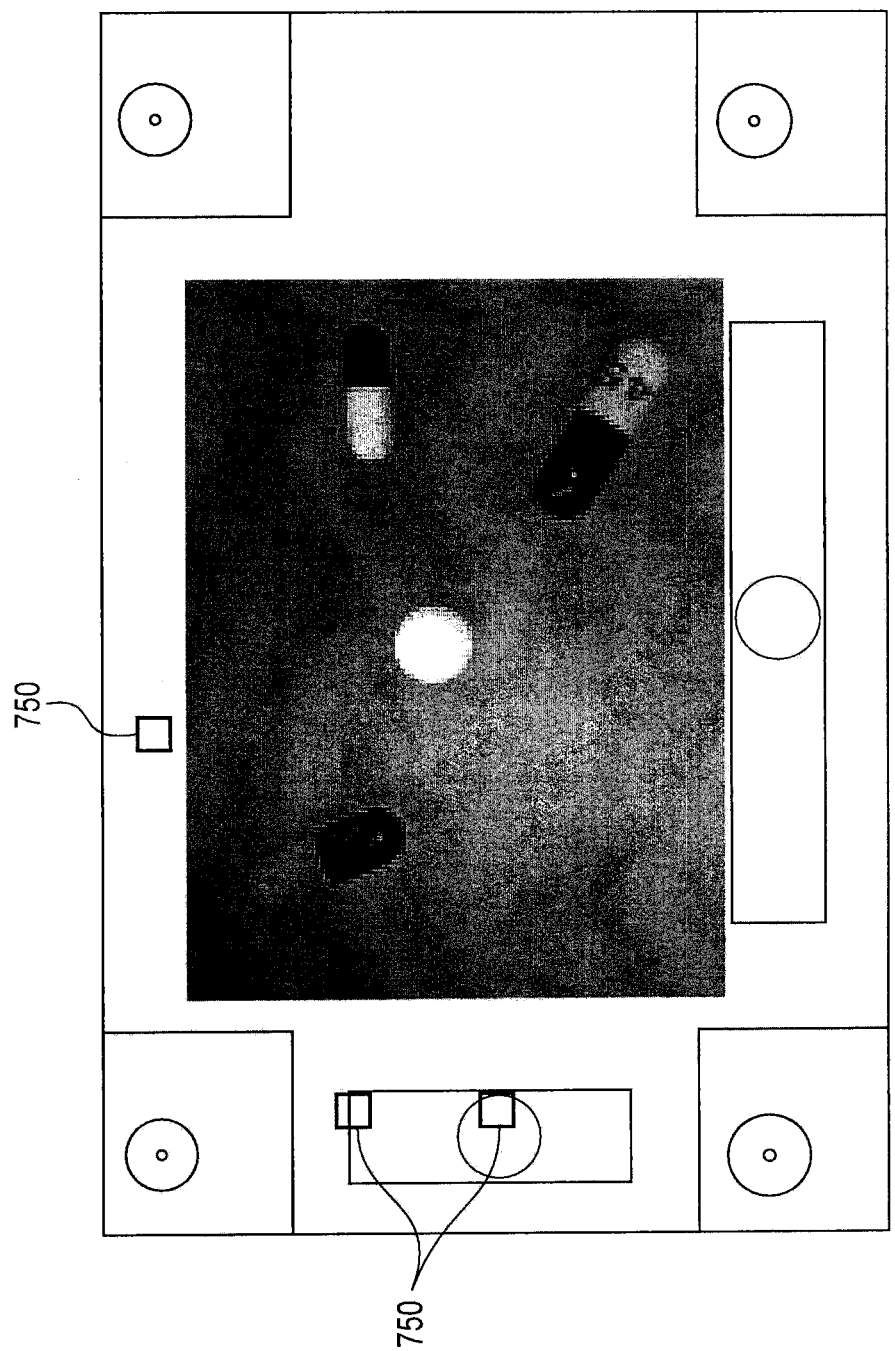

FIG. 7D illustrates visual cues that may be shown when and where a strong shadow is detected. In the example of FIG. 7D, flashing small red squares 750 indicate sampled points in the border 220 where the strong shadows are present (i.e., where the shadow detection test failed).

Figure 7E:
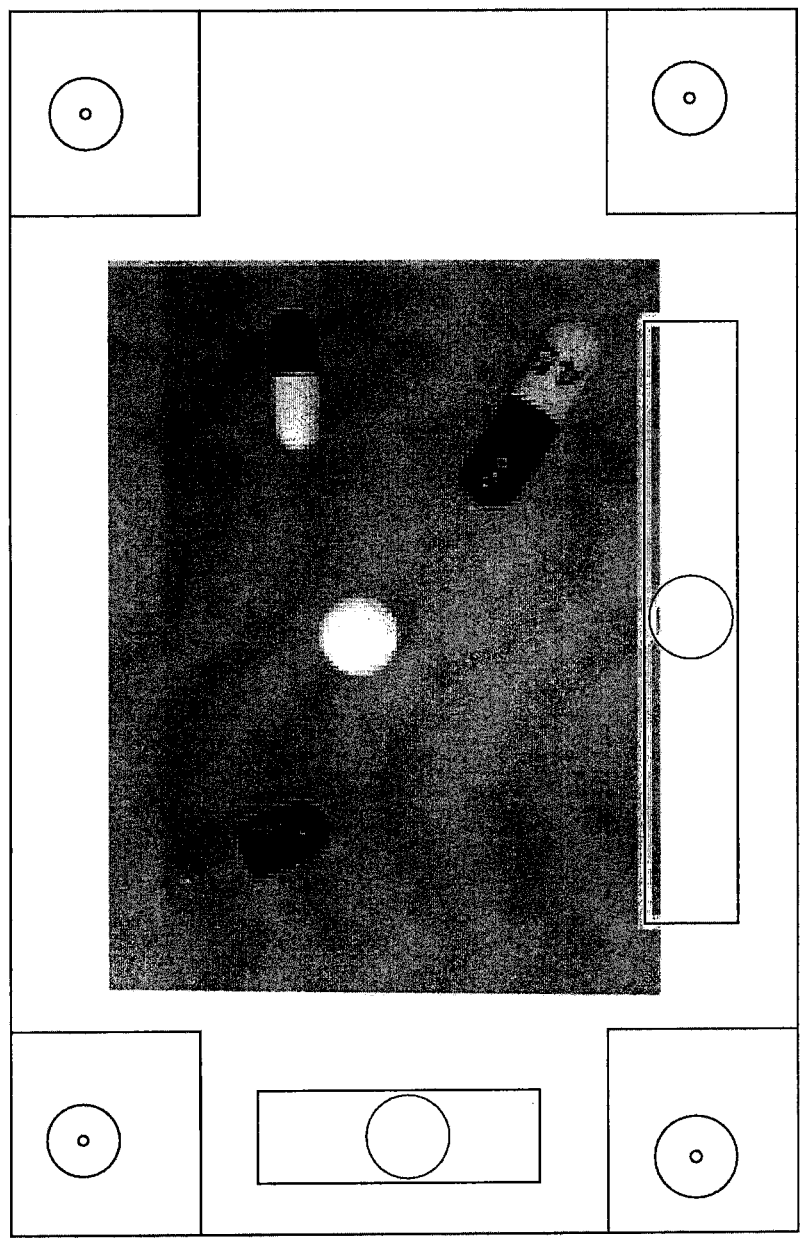

The presence of any of the visual cues communicates to the user that the image is not acceptable. Thus, the user is motivated to adjust the image, as cued by the display. Once adjusted, an acceptable image can be acquired, as illustrated in FIG. 7E.

Once an acceptable image is acquired, the image can be processed for color correction. This is done by sampling areas of the achromatic border 220 which have known color values and comparing the sampled values to the known values. In order to improve the robustness of the sampling process and to avoid errors or noise resulting from inconsistencies on the border 220 (such as, for example, surface speckles, small scratches, or small dirt particles), samples of the border 220 actually represent truncated averages of sets of pixels near the sample point. For example, if a sample is centered at point (x,y) on the border 220, the resulting sample is assigned an average of the color sample of each of the n-by-n pixels centered at the point (x,y). In calculating the average color, outlying pixels are discarded. Thus, the sample for point (x,y) is a truncated average of n-by-n pixels. Multiple sample points are taken around the border 220.

Once a collection of sample points has been collected, the differences between the sampled colors and the known color of the sampled points under ideal lighting conditions is determined. By modeling the color changes across areas of known colors, a predictive mathematical model can be built to approximate the difference of the sampled color to the color of the sampled areas under ideal lighting for each pixel at point (x,y) as a function of its coordinates, as illustrated below in Equation 1.

$$D(L_{x,y}, L_{x,y}^0) \approx d_{x,y} = f(x, y), (x, y) \in S \quad \text{Equation 1.}$$

In Equation 1, $L_{x,y}$ is the observed color/intensity of the pixel at coordinates (x,y), $L_{x,y}^0$ is the color/intensity of the same pixel under ideal lighting, D(,) is an intensity-color differential measure between the observed pixel and its appearance under ideal lighting (e.g., ratios of RGB channels), and S is the set of pixels in the border 220 wherein the color of each pixel under ideal lighting conditions is known. Function $f(x,y)$ is optimized such that the deviations d of all pixels in S are minimized according to some criteria (e.g., sum of squared errors). This can be done by standard statistical regression techniques. In an embodiment, function $f(x, y)$ is a polynomial.

Because the acquired image has passed any applied image diagnostic tests, it can be assumed that the lighting across the entire image is relatively smooth. Lighting across the image may not be uniform, but it may still be smooth. Therefore, function $f(x,y)$, which assumes no discontinuities, can be used to predict color differences to be applied to any pixel in the image. Of particular interest, function $f(x,y)$ can be used to predict color changes to pixels belonging to pills on background 210 under ideal lighting conditions, as shown in Equation 2, below.

$$D(L_{x,y}, L_{x,y}^0) \approx d_{x,y} = f(x, y), \quad \text{Equation 2.}$$

for any (x,y) in the image

Because function $f(x,y)$ determines deviations d, pixel color can be corrected by summing the deviation d predicted by function $f$ at position (x,y) to the observed color of pixel (x,y). Once corrected, pills that are identified through segmentation can be compared by color with the values of pill standardized colors, stored in, for example, a database. The database for comparison and pill identification may be located on the smartphone or may be located remotely. In the case that the comparison and pill identification database is located remotely, the smartphone is configured to send data to the remote database for comparison and identification.

Figure 8:
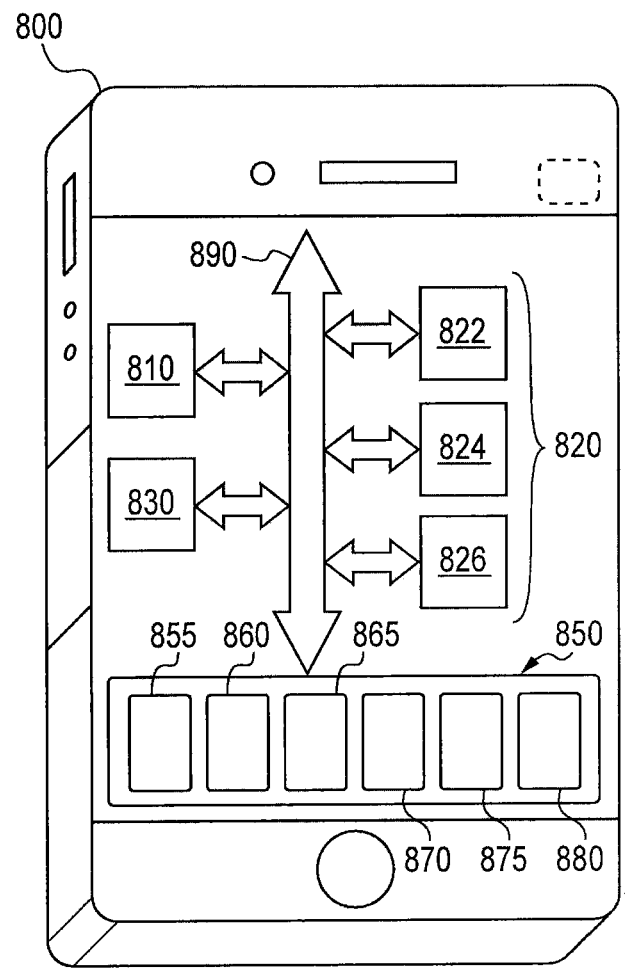
FIG. 8 illustrates a mobile device system for correcting image colors while identifying pills, in accordance with the present disclosure.

Methods 100 and 400 are implemented as either hardware or software, or a combination thereof. The mobile device 800, as illustrated in FIG. 8, includes a system 850 for implementing methods 100 and 400. The system 850 includes a color correction module to be used in conjunction with the mobile devices' camera, processor and a database. The mobile device 800 generally comprises a central processing unit (CPU) 810, such as a microprocessor, a digital signal processor, or other programmable digital logic devices, which communicates with various input/output (I/O) devices 820 over a bus or other interconnect 890. The input/output devices 820 include a digital camera 822 for inputting digital images of pills on the controlled surface 200. The input/output devices may also include a user interface 824 to display pill identification results to a user, and a transmitter 826 for transmission of the pill identification results to a remote location. A memory device 830 communicates with the CPU 810 over bus or other interconnect 890 typically through a memory controller. The memory device 830 may include RAM, a hard drive, a FLASH drive or removable memory for example. The memory device 830 includes one or more databases. The CPU 810 implements the methods 100 and 400 as applied to the digital image obtained by camera 822. The CPU 810 processes the digital image, compares the colors identified for each pill in the obtained image to one or more pill databases, at least one of which is stored in the memory device 830, and then outputs pill identification results via the user interface 824 and/or the transmitter 826. If desired, the memory device 830 may be combined with the processor, for example CPU 810, as a single integrated circuit.

System 850 includes the color correction module 855. The color correction module 855 performs methods 100 and 400. The color correction module 855 can run various diagnostic modules such as a exposure check module 860, a focus check module 865, a shadow detection test module 870 and a camera tilt angle detection test module 875. In addition to the diagnostic tests identified in method 400, the color correction module 855 can run additional tests 880 or provide additional visual cues to a user. As an example, system 850 and the modules used within system 850 may be implemented as an application on a smartphone.

The above description and drawings are only to be considered illustrative of specific embodiments, which achieve the features and advantages described herein. Modifications and substitutions to specific process conditions can be made. Accordingly, the embodiments of the invention are not considered as being limited by the foregoing description and drawings, but is only limited by the scope of the appended claims.

What is claimed as new and desired to be protected by Letters Patent of the United States is:

1. A method of correcting colors in an image, the method comprising:
    using a digital camera and a surface to obtain a digital image representing one or more pills on the surface, the surface including a background upon which the one or more pills are positioned, a border extending around the background, and a plurality of target objects;
    identifying areas of the image that correspond to areas of the surface with known colors and features;
    performing image diagnostics on the image to identify imaging conditions adverse to color-correction; and
    if image diagnostic results are acceptable, correcting color in the image based on a comparison of image colors with corresponding surface areas with known colors.

2. The method of claim 1, wherein the border is achromatic.

3. The method of claim 1, wherein a color of the border is known.

4. The method of claim 1, wherein the plurality of target objects are positioned within the border.

5. The method of claim 1, wherein the plurality of target objects include one or more high-contrast features.

6. The method of claim 5, wherein the plurality of target objects each include an anchor point whose position with respect to other anchor points is known.

7. The method of claim 6, wherein the step of identifying areas of the image that correspond to areas of the surface includes identifying the anchor points in the image that correspond to the anchor points on the surface.

8. The method of claim 7, wherein the anchor points are identified by locating the plurality of target objects within regions of the image wherein the target objects are likely to be located, and using the high contrast features in the target objects to identify the anchor points.

9. The method of claim 7, wherein the positions of imaged anchor points with respect to each other are compared with the positions of anchor points on the surface in order to correct for geometric variations between the image and the surface.

10. The method of claim 9, wherein the image diagnostics include an exposure check.

11. The method of claim 10, wherein the exposure check includes determining that a color of an area in the image is within a predetermined range of a color of a corresponding area of the surface.

12. The method of claim 11, wherein the area in the image and on the surface whose color is used for the exposure check is at least one of the plurality of target objects.

13. The method of claim 9, wherein the image diagnostics include a focus check.

14. The method of claim 13, wherein the focus check includes determining that a percentage of high-contrast pixels within a target object exceeds a predetermined threshold.

15. The method of claim 14, further comprising indicating on a real-time display of the image which target objects pass the focus check by having a percentage of high-contrast pixels that exceed the predetermined threshold.

16. The method of claim 15, wherein the indicating includes displaying colored boxes around the target objects, with a color of the box indicating whether the target objects pass the focus check.

17. The method of claim 9, wherein the image diagnostics include a shadow detection test.

18. The method of claim 17, wherein the shadow detection test includes sampling areas of the image that correspond to the border and comparing a light intensity of the sampled areas to each other.

19. The method of claim 18, wherein if a light intensity of one sampled area differs from a light intensity of a neighboring sampled area by more than a predetermined amount, a shadow with an edge is detected and the image is not used.

20. The method of claim 19, further comprising indicating on a real-time display of the image where the shadow edge is detected.

21. The method of claim 9, wherein the image diagnostics include a camera tilt angle detection test.

22. The method of claim 21, wherein the camera tilt angle detection test calculates ratios of distance between pairs of anchor points in the image and compares the ratios with corresponding ratios of distance between pairs of anchor points on the surface, and wherein if the compared ratios differ by more than a predetermined amount, the image is not used.

23. The method of claim 22, further comprising indicating on a real-time display of the image a direction in which the image is tilted.

24. The method of claim 23, further comprising indicating on a real-time display of the image a relative amount by which the image is tilted.

25. The method of claim 24, wherein a digital bubble is represented on the display in order to indicate direction and relative amount of tilt.

26. The method of claim 1, wherein the step of correcting colors in the image is performed using statistical regression applied to a predetermined function.

27. The method of claim 26, wherein the predetermined function is a polynomial.

28. The method of claim 1, further comprising comparing the corrected colors of pills in the image with a database of known colors for pills.

29. A system for correcting colors in an image, comprising:
a surface for imaging one or more pills, the surface including a background upon which the one or more pills are positioned, a border extending around the background, and a plurality of target objects;
a digital camera; and
a processor for receiving from the digital camera a digital image representing the one or more pills on the surface and for processing the digital image in order to identify areas of the image that correspond to areas of the surface with known colors and features, perform image diagnostics on the image to identify imaging conditions adverse to color-correction, and, if image diagnostic results are acceptable, correct color in the image based on a comparison of image colors with corresponding surface areas with known colors.

30. The system of claim 29, wherein the border is achromatic.

31. The system of claim 29, wherein a color of the border is known.

32. The system of claim 29, wherein the plurality of target objects are positioned within the border.

33. The system of claim 29, wherein the plurality of target objects include one or more high-contrast features.

34. The system of claim 33, wherein the plurality of target objects each include an anchor point whose position with respect to other anchor points in known.

35. The system of claim 34, wherein the processor is configured to identify the anchor points in the image that correspond to the anchor points on the surface.

36. The system of claim 35, wherein the processor is configured to identify the anchor points by locating the plurality of target objects within regions of the image wherein the target objects are likely to be located, and using the high contrast features in the target objects to identify the anchor points.

37. The system of claim 35, wherein the processor is configured to compare the positions of imaged anchor points with respect to each other with the positions of anchor points on the surface in order to correct for geometric variations between the image and the surface.

38. The system of claim 37, further comprising an exposure check module that is one of the image diagnostics.

39. The system of claim 38, wherein the exposure check module is configured to determine that a color of an area in the image is within a predetermined range of a color of a corresponding area of the surface.

40. The system of claim 39, wherein the area in the image and on the surface whose color is used by the exposure check module is at least one of the plurality of target objects.

41. The system of claim 37, further comprising a focus check module that is one of the image diagnostics.

42. The system of claim 41, wherein the focus check module is configured to determine that a percentage of high-contrast pixels within a target object exceeds a predetermined threshold.

43. The system of claim 42, wherein the focus check module is further configured to indicate on a real-time display of the image which target objects pass the focus check by having a percentage of high-contrast pixels that exceed the predetermined threshold.

44. The system of claim 43, further comprising a real-time display, wherein the focus check module is configured to display colored boxes around the target objects, with a color of the box indicating whether the target objects pass the focus check.

45. The system of claim 37, further comprising a shadow detection test module that is one of the image diagnostics.

46. The system of claim 45, wherein the shadow detection test module is configured to sample areas of the image that correspond to the border and compare a light intensity of the sampled areas to each other.

47. The system of claim 46, wherein if a light intensity of one sampled area differs from a light intensity of a neighboring sampled area by more than a predetermined amount, the shadow detection test module is configured to detect a shadow with an edge and to indicate that the image is not to be used.

48. The system of claim 47, further comprising a real-time display, wherein the shadow test module is configured to indicate on the display where the shadow edge is detected in the image.

49. The system of claim 37, further comprising a camera tilt angle detection test module that is one of the image diagnostics.

50. The system of claim 49, wherein the camera tilt angle detection test module is configured to calculate ratios of distance between pairs of anchor points in the image and compare the ratios with corresponding ratios of distance between pairs of anchor points on the surface, wherein if the compared ratios differ by more than a predetermined amount, the camera tilt angle detection test module is configured to indicate that the image is not to be used.

51. The system of claim 50, further comprising a real-time display, wherein the camera tilt angle detection test module is configured to indicate on the display a direction in which the image is tilted.

52. The system of claim 51, wherein the camera tilt angle detection test module is configured to indicate on the display a relative amount by which the image is tilted.

53. The system of claim 52, wherein the camera tilt angle detection test module is configured to indicate on the display a digital bubble in order to indicate direction and relative amount of tilt.

54. The system of claim 29, wherein the processor is configured to correct colors in the image by using statistical regression applied to a predetermined function.

55. The system of claim 54, wherein the predetermined function is a polynomial.

56. The system of claim 29, The method of claim 1, further comprising a database of known colors for pills by which the corrected colors of pills in the image are compared.

* * * * *